May 28, 1957

F. H. GOODING 2,794,169

CABLE-TESTING APPARATUS

Filed July 22, 1955

INVENTOR:
FRANCIS H. GOODING

2,794,169
CABLE-TESTING APPARATUS

Francis H. Gooding, Lodi, N. J., assignor to The Okonite Company, Passaic, N. J., a corporation of New Jersey Application July 22, 1955, Serial No. 523,835

4 Claims. (Cl. 324—54)

This invention relates to an improved method of and apparatus for locating voids and other imperfections in the insulation of insulated wires and cables.

In my co-pending application Serial No. 376,639, filed August 26, 1953, I disclose a method and apparatus for locating voids and other imperfections in insulated wires and cables wherein I employ aural equipment, such as a radio receiver, for example, for indicating or detecting the imperfections.

The present invention is an improvement in the invention of the aforesaid application in that, in addition to the aural equipment, it provides for the production of a permanent, visual record of conditions existing in the insulation of the cable being tested.

As will be brought out more fully hereinafter, the present invention has certain material advantages over my prior method in that it does not require the close attention on the part of the operator that is necessary when a radio receiver only is employed as the detecting or indicating device, and the operator is not misled by outside interferences as he may be when only employing a radio receiver in that, with the method of the instant invention, a permanent pattern is produced on a recording tape when a void or other imperfection is present in the insulation being tested. This pattern is easily and readily distinguishable from a recording caused by some outside disturbance, such as sparking motors, switching operations, and other disturbances always associated with operations in a plant. While it is a fact that the sound produced by outside disturbances may be distinguished by the trained ear from that produced by ionization of a void in the insulation being tested, I have found that the method of the instant invention does not require the services of as highly a trained operator as where aural equipment alone is employed because of the distinctive characteristics of the pattern produced by ionization of a void, as compared with that produced by outside disturbances such as I have referred to above.

The present invention has the further advantage that, because of the permanency of the record produced, it is unnecessary for the operator to devote as close attention to the test as he must where only a momentary aural signal is produced when a void is encountered.

A further advantage inherent in the instant invention resides in the fact that the type of pattern produced depends to some degree upon the location of the void in the insulation relative to the conductor, which facilitates ready locating of the void.

In general, the present equipment involves a fairly long tube, say 20 feet, provided midway of its length with a short, electrically conducting metal sleeve. A small tank filled with a semi-conducting fluid, distilled water, for example, is provided at each end of the insulating tube, these tanks being in constant communication with the tube. The conducting metal sleeve is connected to one side of the secondary of a 60-cycle, high-voltage, transformer, the other side of the transformer secondary being grounded. The side of the transformer secondary which is connected to the conducting metal sleeve is electrically connected to a recording galvanometer, the pen or stylus of which produces a permanent record on a traveling tape. As an insulated cable progesses through the semi-conducting fluid in the insulating tube, it will be apparent that the voltage at the surface of the cable insulation to one side of the conducting sleeve gradually increases until the midway point in the conducting sleeve is reached, at which point the voltage at the surface of the cable insulation is maximum. Consequently, should there be a void in the cable insulation, the voltage across this void will increase as the cable moves forward, until the voltage is sufficient to break down and ionize the void. At this moment, the galvanometer needle will be deflected, the degree of deflection increasing until the void has reached the center of the conducting sleeve, at which point the swing or deflection of the needle is maximum. On continued forward movement of the cable, the needle deflection gradually decreases until it reaches zero. It will be apparent, therefore, that the pattern or track upon the tape will not only indicate to the operator that the insulation is defective but will indicate the precise location of the defect so far as its position lengthwise of the cable is concerned in that the maximum deflection of the galvanometer needle takes place when the void has reached the midpoint of the conductive sleeve of the insulating tube.

In the accompanying drawings.

Figure 1:
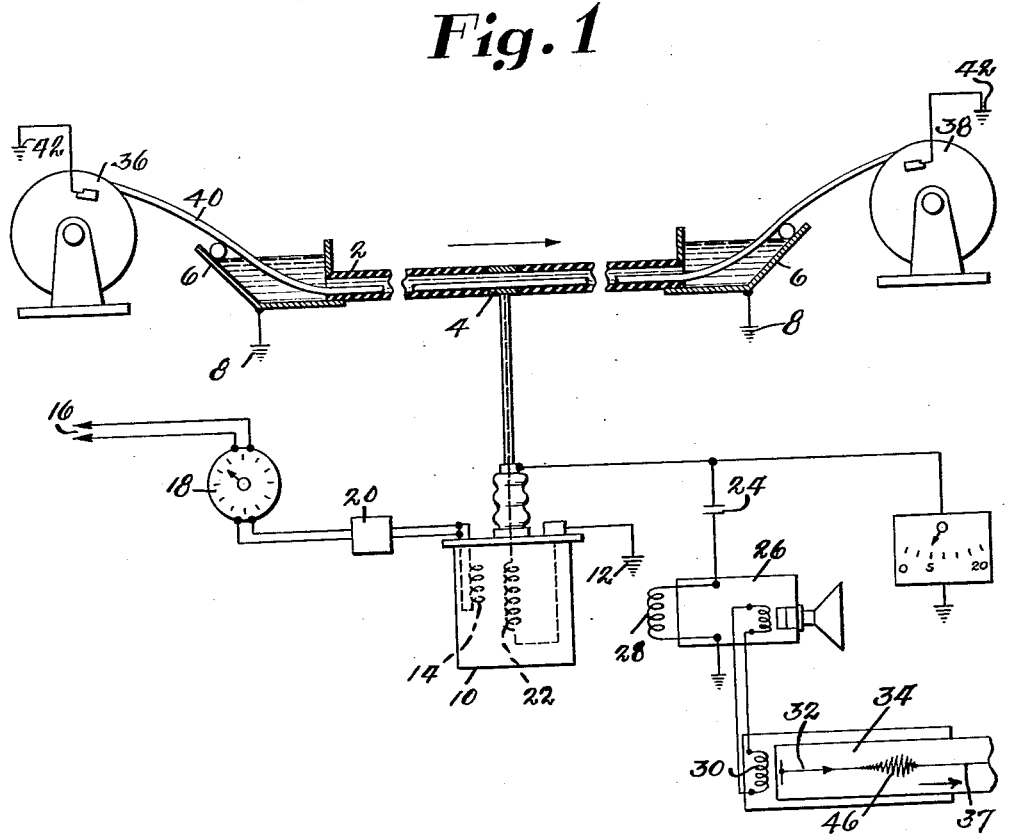
Fig. 1 is a layout of equipment suitable for the practice of the invention.

Referring to the drawings in detail,

2 designates a tube of insulating material of an appreciable length, I have been employing a tube about 20 feet long. Midway of its length, this tube is provided with an electrically conducting sleeve 4. Located at each end of the insulating tube 2 is a tank 6. These tanks are in open communication with the tube 2, and during testing, the tanks and tube are kept filled with chemically pure water or other liquid of low electrical conductivity, in which the cable being tested is completely submerged. The tanks 6 are grounded, as indicated at 8.

10 designates a high-voltage transformer, the primary winding 14 of which receives its energy from a 60-cycle power source 16. 18 designates a voltage regulator and 20 a circuit breaker in the line to the transformer primary.

The secondary winding 22 of the transformer 10 is grounded at 12, and the other side of this secondary is connected to the conducting sleeve or section 4 of the tube 2. The side of the transformer secondary which is connected to the conducting sleeve 4 is connected, through a high-voltage, corona-free condenser 24, to a radio receiver 26. The charging current of the condenser 24 is by-passed around the receiver 26 by connecting a small inductor 28 across the receiver terminals. The inductance of this inductor 28 is sufficient to present a high impedance to the high-frequency corona currents but only a low impedance to the 60-cycle power current passing through the high-voltage condenser 24, so that the receiver will respond only to the high-frequency corona voltage which is generated in the cable under test when corona is initiated in the void.

Connected to the output of the receiver 26 is a recording galvanometer 30, the recording pen or stylus of which is designated 32. 34 designates the paper tape which cooperates with the galvanometer pen in conventional fashion, the tape traveling in the direction of the arrow thereon.

36 and 38 designate a let-off reel and a take-up reel, respectively, located adjacent the tanks 6. A cable length to be tested is shown at 40, and it is drawn from the let-off reel 36 through the water in the adjacent tank 6 and rewound upon the take-up reel 38. The cable is completely submerged in the water. The cable conductor is grounded at the reels 36 and 38, as illustrated at 42.

It will be appreciated that, with a setup such as just described, there will be a voltage gradient between the middle of the conducting sleeve 4 and the ends of the insulating tube 2, maximum voltage being reached at the middle of the sleeve. It will be apparent, therefore, that, if the voltage at any point between the entry end of the insulating tube 2 and half-way along the sleeve 4 is sufficiently high to ionize a void existing in the insulation of a cable progressing through the tube, a sound will be heard in the radio receiver 26, this sound increasing in volume until the cable has advanced sufficiently to bring the void to the middle of the sleeve. At this moment the sound at the radio receiver is maximum. The sound decreases in volume as the cable continues to move forward until it is no longer audible. It will be apparent that, while a void can be located with considerable accuracy simply by employing the radio receiver, outside disturbances, such as will usually be encountered in any plant installation, will also be heard in the receiver, so that it not only becomes necessary for the operator to listen almost constantly to the receiver, but he must be trained to be able readily to distinguish between a signal due to the presence of a void in the cable insulation and that due to some outside interference, such as a sparking motor, for example.

I have found that by connecting a recording galvanometer, such as shown at 30, to the same side of the secondary 22 of the transformer 10 that is connected to the conducting sleeve 4, a distinctive, permanent, and readily identifiable visual pattern will be produced on the tape 34 due to deflection of the galvanometer pen or stylus 32 when a void exists in the insulation being tested. It should be noted also that, because the voltage across a void increases as the cable moves forward toward the sleeve 4, there will be a corresponding increase in the extent of deflection of the galvanometer pen or stylus, which will produce a pattern upon the recording tape of such design or shape as to be recognized readily as due to a void in the cable insulation.

In setting up the equipment for testing, the cable is drawn off the let-off reel 36 and threaded through the tube 2 and attached to the take-up reel 38. The regulator 18 is then set so that the voltage at the surface of the insulation midway of the sleeve 4 is somewhat higher than the normal rated operating voltage of the cable. For example, if the operating voltage of the cable is 12,000 volts, then the regulator 18 would be set for a voltage of 18,000, for example, at the surface of the cable insulation midway of the conducting sleeve 4. In other words, in order that a void in the insulation which might cause cable failure when the cable is put into operation may not be missed, I employ a testing voltage considerably higher than the operating voltage of the cable.

In practice, a cable 40, the operating voltage of which is to be 12,000 volts, for example, is drawn continuously, completely submerged, through the tube 2 from the let-off reel 36 to the take-up reel 38. The regulator 18, we shall assume, has been set for 18,000 volts. As long as the cable insulation is free of voids the corona initiation voltage of which is higher than 18,000 volts, the pen or stylus 32 of the recording galvanometer will simply impose a straight line 37 upon the traveling tape 34. Should there be some outside interference during the run, such as momentary sparking at a switch, for example, the galvanometer pen may be deflected slightly, but only momentarily, to produce a slight irregularity in the line 37, as I have indicated at 39. Assuming, however, that a void exists in the insulation the corona initiation voltage of which is, for example, 10,000 volts, it is quite apparent that, when the void reaches a point in the tube 2 where the voltage at the cable surface is 10,000 volts, the galvanometer pen or stylus will be deflected, the extent or amplitude of the deflection of the pen or stylus increasing as the cable moves forward until the midpoint of sleeve 4 has been reached, where needle deflection is maximum. On continued forward movement of the cable, the extent of deflection of the galvanometer pen or stylus is gradually reduced, until the void has reached the area in the tube 2 at which the voltage is less than the corona extinction voltage of the void, at which point deflection of the galvanometer pen is zero, so that, on continued forward movement of the cable, the record produced upon the chart or tape 34 again will be a straight line.

Figure 2:
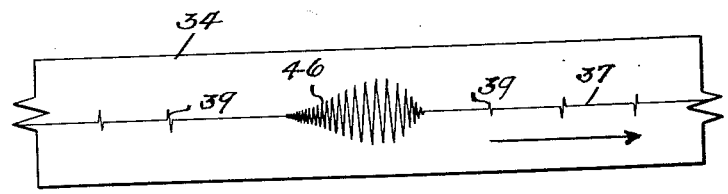
Fig. 2 is a fragmentary plan view of the chart or tape to which a permanent record is applied throughout the entire test run.

In Fig. 2 of the drawing, the large pattern 46 is the distinctive type of permanent pattern or design which is produced upon the chart 34 under the conditions above assumed. It will be observed from the drawing that the pattern 46 is symmetrical, so far as needle deflection each side of zero is concerned. I have found that this indicates that the void is between the cable conductor and the surface of the insulation. When the void is at the outer face of the conductor or at the surface of the insulation, then the pattern is asymmetrical, the galvanometer pen or stylus swinging farther to one side of zero than at the other side.

When the operator notes the production of this distinctive pattern upon the chart 34, he reverses the cable travel until the deflection of the galvanometer pen or stylus is again maximum, which, of course, indicates that the void again is at the midpoint in the conducting sleeve 4. He may then mark the cable at the discharge end of the tube 2 and then simply draw the cable forward again for a distance equal to the distance from the center of the sleeve to the discharge end of the tube 2, which will bring the void to the end of the tube. The insulation may then be marked at this point and repair made after the entire cable length has been tested.

It will be seen from all of the foregoing that my invention provides for the continuous testing of insulating cables of unlimited length. It will be seen furthermore that I have provided for making or producing in distinctive and readily recognizable pattern a permanent record of the condition of the cable insulation so far as voids are concerned. Not only is this pattern readily distinguished from the pattern or record caused by outside interference, but it enables the location of the void to be readily determined, both with respect to the length of the cable as well as with respect to its cross-section.

It is to be understood that changes may be made in the layout illustrated without departing from the spirit and scope of the invention.

What I claim is:

1. Apparatus for detecting the presence and location of voids in the insulation of electric wire and cable, said apparatus comprising, in combination, a tube of insulating material having a conducting section intermediate its ends; a tank at each end of said tube, said tanks being grounded and in constant communication with the tube; a body of semi-conducting fluid in said tanks and tube; a transformer having one side of its secondary connected to said conducting section of the tube and the other side of its secondary connected to ground, so that as a grounded wire or cable progresses through said tube and through the semi-conducting fluid, there will be a gradual, progressive increase in the voltage between the surface of the insulation and the conductor of the wire or cable until the said conducting section of the tube is reached; a recording device electrically connected to the same side of the transformer secondary which is connected to the conducting section of the tube and comprising means in said connection for preventing application of the supply voltage to the recording device, whereby said recording device will produce a continuous, visual, and permanent record pattern of the insulating characteristics of the insulation as the wire or cable progresses through said tube, this pattern varying upon variation in the said voltage rise initiated by the existence of a void in the insulation.

2. Apparatus for detecting the presence and location of voids in the insulation of electric wire and cable, said apparatus comprising, in combination, a tube of insulating material having a conducting section intermediate its ends; a tank at each end of said tube, said tanks being grounded and in constant communication with the tube; a body of semi-conducting fluid in said tanks and tube; a transformer having one side of its secondary connected to said conducting section of the tube and the other side of the secondary grounded so that, as a grounded insulated wire or cable progresses through said tube and through the semi-conducting fluid therein, there will be a gradual, progressive increase in the voltage between the surface of the insulation and the conductor of the wire or cable until the said conducting section of the tube is reached; a recording device electrically connected to the same side of the transformer secondary which is connected to the conducting section of the tube and comprising means in said connection for preventing application of the supply voltage to the recording device, whereby said recording device will produce a continuous, visual, and permanent record pattern of the insulating characteristics of the insulation as the wire or cable progresses through said tube, this pattern varying with any variation in the said voltage rise initiated by the existence of a void in that part of the wire or cable insulation which at the moment said variation in voltage occurs is moving through the tube.

3. Apparatus for detecting the presence and location of voids in the insulation of electric wire and cable, said apparatus comprising, in combination, a tube of insulating material having a conducting section intermediate its ends; a tank at each end of said tube, said tanks being grounded and in constant communication with the tube; a body of semi-conducting fluid in said tanks and tube; a grounded transformer having one side of its secondary connected to said conducting section of the tube and the other side of the secondary connected to ground, so that, as a grounded wire or cable progresses through said tube and the semi-conducting fluid therein, there will be a gradual, progressive increase in the voltage between the surface of the insulation and the conductor of the wire or cable until the said conducting section of the tube is reached; a recording device electrically connected to the same side of the transformer secondary which is connected to the conducting section of the tube; and means in said electrical connection for preventing application of the supply voltage to the recording device, said recording device comprising a continuously moving tape and a cooperating recording pen or stylus for producing upon the tape a continuous, visual, and permanent record pattern of the insulating characteristics of the insulation as the wire or cable progresses through said tube, said pen or stylus being oscillated relatively to said tape upon a variation in the said voltage rise initiated by the existence of a void in that part of the insulation which is within said tube at the moment said variation in voltage rise occurs, thereby to produce a change in the record pattern produced upon said tape.

4. Apparatus for detecting the presence and location of voids in the insulation of electric wire and cable, said apparatus comprising, in combination, a tube of insulating material having a conducting section intermediate its ends; a tank at each end of said tube, said tanks being grounded and in constant communication with the tube; a body of semi-conducting fluid in said tanks and tube; a transformer having one side of its secondary connected to said conducting section of the tube and the other side of the secondary connected to ground, so that, as a grounded insulated wire or cable progresses through said tube and the semi-conducting fluid therein, there will be a gradual, progressive increase in the voltage between any part of the surface of the insulation and the conductor of the wire or cable moving through the tube toward the said conducting section of the tube until the conducting section of the tube is reached; a recording galvanometer and a continuously moving tape cooperating therewith electrically connected to the same side of the transformer secondary which is connected to the conducting section of the tube, whereby a permanent, visual record is produced upon said tape of the insulating characteristics of the insulation of the progressing wire or cable; and means for preventing application of the supply voltage to said galvanometer, the pattern produced by the galvanometer varying in accordance with variations in voltage rise initiated by the existence of a void in the insulation of the wire or cable.

References Cited in the file of this patent
UNITED STATES PATENTS 2,452,624   Zimmermann ---------- Nov. 2, 1948
2,460,107   Slade ---------------- Jan. 25, 1949